United States Patent
Jongkind et al.

(10) Patent No.: US 10,864,503 B2
(45) Date of Patent: *Dec. 15, 2020

(54) PROCESS FOR THE PREPARATION OF A HYDROCRACKING CATALYST

(71) Applicant: SHELL OIL COMPANY, Houston, TX (US)

(72) Inventors: Hermanus Jongkind, Amsterdam (NL); Wiebe Sjoerd Kijlstra, Amsterdam (NL); Bart Pelgrim, Amsterdam (NL); Marcello Stefano Rigutto, Amsterdam (NL); Ferry Winter, Amsterdam (NL)

(73) Assignee: Shell Oil Company, Houston, TX (US)

( * ) Notice: Subject to any disclaimer, the term of this patent is extended or adjusted under 35 U.S.C. 154(b) by 261 days.

This patent is subject to a terminal disclaimer.

(21) Appl. No.: 14/428,496

(22) PCT Filed: Sep. 16, 2013

(86) PCT No.: PCT/EP2013/069113
§ 371 (c)(1),
(2) Date: Mar. 16, 2015

(87) PCT Pub. No.: WO2014/041152
PCT Pub. Date: Mar. 20, 2014

(65) Prior Publication Data
US 2015/0273447 A1 Oct. 1, 2015

(30) Foreign Application Priority Data
Sep. 17, 2012 (EP) .................................... 12184695

(51) Int. Cl.
| | | |
|---|---|---|
| B01J 29/16 | (2006.01) | |
| B01J 37/04 | (2006.01) | |
| B01J 37/20 | (2006.01) | |
| B01J 35/00 | (2006.01) | |
| B01J 23/888 | (2006.01) | |
| B01J 37/02 | (2006.01) | |
| C10G 47/20 | (2006.01) | |
| B01J 21/04 | (2006.01) | |
| B01J 31/06 | (2006.01) | |
| B01J 37/08 | (2006.01) | |
| B01J 29/14 | (2006.01) | |
| B01J 23/883 | (2006.01) | |

(52) U.S. Cl.
CPC ............ B01J 29/166 (2013.01); B01J 21/04 (2013.01); B01J 23/883 (2013.01); B01J 23/888 (2013.01); B01J 23/8885 (2013.01); B01J 29/146 (2013.01); B01J 31/06 (2013.01); B01J 35/0006 (2013.01); B01J 37/0203 (2013.01); B01J 37/0205 (2013.01); B01J 37/0213 (2013.01); B01J 37/04 (2013.01); B01J 37/08 (2013.01); B01J 37/20 (2013.01); C10G 47/20 (2013.01); B01J 2229/16 (2013.01); B01J 2229/186 (2013.01); B01J 2229/42 (2013.01)

(58) Field of Classification Search
CPC ....................................................... B01J 29/166
USPC .......................................................... 502/60
See application file for complete search history.

(56) References Cited

U.S. PATENT DOCUMENTS

| | | | | |
|---|---|---|---|---|
| 5,686,375 | A | * | 11/1997 | Iyer .......................... B01J 23/85 502/211 |
| 2005/0197249 | A1 | | 9/2005 | Creyghton et al. |
| 2007/0135300 | A1 | * | 6/2007 | Kagami .................. B01J 23/85 502/208 |
| 2009/0118556 | A1 | | 5/2009 | Euzen et al. |
| 2011/0000824 | A1 | | 1/2011 | Zhan et al. |
| 2012/0279901 | A1 | * | 11/2012 | Domokos .............. B01J 23/888 208/109 |

FOREIGN PATENT DOCUMENTS

| | | |
|---|---|---|
| CN | 1938088 | 3/2007 |
| CN | 102648048 | 8/2012 |
| EP | 310164 | 4/1989 |
| EP | 310165 | 4/1989 |
| EP | 428224 | 5/1991 |
| EP | 1880760 | 1/2008 |
| EP | 2474357 | 7/2012 |
| WO | 9932582 | 7/1999 |
| WO | 2011067258 | 6/2011 |

OTHER PUBLICATIONS

Handbook of Commercial Catalysts: Heterogeneous Catalysts Howard Rase, p. 349 and 350, 2000.*
International Search Report for PCT/EP2013/069113 dated Jan. 7, 2014.

* cited by examiner

*Primary Examiner* — Douglas B Call
(74) *Attorney, Agent, or Firm* — Charles W. Stewart

(57) ABSTRACT

This invention relates to a process for the preparation of a hydrocracking catalyst and its use. A zeolite Y having specifically defined properties is mixed with an alumina binder component and a first metals-containing solution that is extruded to form an extruded mixture. The extruded mixture is dried and calcined. The dried and calcined mixture is then impregnated with a second metals-containing solution.

12 Claims, No Drawings

PROCESS FOR THE PREPARATION OF A HYDROCRACKING CATALYST

PRIORITY CLAIM

The present application is the National Stage (§ 371) of International Application No. PCT/EP2013/069113, filed Sep. 16, 2013, which claims priority from European Application No. 12184695.0, filed Sep. 17, 2012 incorporated herein by reference.

FIELD OF THE INVENTION

The present invention provides a process for the preparation of a hydrocracking catalyst, and a hydrocracking process wherein use is made of the hydrocracking catalyst.

BACKGROUND OF THE INVENTION

Hydroconversion processes are important in the modern world in providing important basic fuels for everyday life. As it becomes of an increasing necessity to utilize heavier crude oil feedstocks, the oil refining industry has turned to hydrocracking processes to provide the lighter basic fuels which modern society demands. In certain regions, e.g. North America, the lighter liquid products boiling below 191° C. are more in demand than middle distillate products. Such lighter products are called the naphtha fractions, with heavy naphtha (the fraction boiling from 82° C. to 191° C.) being particularly desirable. There has been considerable effort devoted to the development of hydrocracking catalysts which combine high naphtha selectivity with a low tendency to overcrack towards light products, in particular to the less valuable $C_1$-$C_3$ and $C_4$ gaseous by-products, in combination with limited hydrogenation of aromatic rings.

Naphtha preferably has a high amount of aromatics as this gives a high octane number for the gasoline derived from it. A further advantage of less aromatics hydrogenation is that less hydrogen is consumed which is attractive from a process operation point of view. Limited hydrogenation and the resulting high aromatics content is not easily achieved as the hydrocracking catalyst preferably has a high hydrogenation activity in order to prevent overcracking of the feedstock.

SUMMARY OF THE INVENTION

It has now surprisingly been found the activity and the selectivity to heavy naphtha of a faujasite based hydrocracking catalyst can be further improved when starting from a particular zeolite Y a specific sequence of steps is applied to prepare the hydrocracking catalyst.

Accordingly, the present invention provides a process for the preparation of a hydrocracking catalyst, which comprises the steps of:
(a) mixing a zeolite Y having a unit cell size in the range of from 24.42 to 24.52 Å, a bulk silica to alumina molar ratio (SAR) in the range of from 10 to 15, and a surface area of from 910 to 1020 m$^2$/g with an alumina binder component and two or more catalytically active metal components which metal components are contained in one or more solutions, wherein the zeolite Y is present in an amount of 40 wt. % or greater, based on the total weight of the zeolite Y and the alumina binder component;
(b) extruding the mixture as obtained in step (a);
(c) drying the extruded mixture as obtained in step (b);
(d) calcining the dried and extruded mixture as obtained in step (c); and
(e) mixing the calcined product as obtained in step (d) with two or more catalytically active metal components which metal components are contained in one or more solutions.

The hydrocracking catalyst prepared in accordance with the present invention displays an improved performance in terms of activity and selectivity towards heavy naphtha.

The present invention further provides a process for hydrocracking a hydrocarbonaceous feedstock, which process comprises contacting the feedstock at elevated temperature with the hydrocracking catalyst prepared with the present process.

DETAILED DESCRIPTION OF THE INVENTION

The unit cell size of the zeolite Y used in step (a) of the present invention has a unit cell size is in the range of from 24.42 to 24.52 Å, preferably of from 24.42 to 24.50 Å. More preferably, the unit cell size is of from 24.43 to 24.49 Å. The bulk silica to alumina molar ratio (herein also termed "SAR") of the zeolite is at least 10, preferably above 10, preferably at least 10.2, more preferably at least 10.3, most preferably at least 10.5. The upper limit of the SAR is 15, preferably at most 14, more preferably at most 13, especially at most 12.5, most preferably at most 12. The surface area of the zeolite is preferably at least 920 m$^2$/g, more preferably at least 950 m$^2$/g. Generally, the surface area will be at most 1010 m$^2$/g, more specifically at most 1000 m$^2$/g. A high surface area is advantageous in that it means that there is a large surface area available for catalysis. The zeolite Y preferably has an alkali level of less than 0.15% wt based on the zeolite, more preferably less than 0.10% wt. The zeolite desirably has as low an alkali level as possible.

The silica to alumina molar ratio of the faujasite zeolite of the invention is the bulk or overall ratio. This can be determined by any one of a number of chemical analysis techniques. Such techniques include X-ray fluoresence, atomic adsorption, and ICP (inductive coupled plasma). All will provide substantially the same bulk ratio value.

The unit cell size for a zeolite Y is a common property and is assessable to an accuracy of ±0.01 Å by standard techniques. The most common measurement technique is by X-ray diffraction (XRD) following the method of ASTM D3942-80.

The zeolite Y is present in an amount of 40 wt. % or greater, based on the total weight of the zeolite Y and the alumina binder component. Preferably, The zeolite Y is present in an amount of 45 wt. % or greater, more preferably in the range of from 50-95 wt. %, most preferably in the range of from 60-90 wt. % based on the total weight of the zeolite Y and the alumina binder component. Preferably, Surface area is determined in accordance with the well known BET (Brunauer-Emmett-Teller) nitrogen adsorption technique, often simply termed the BET method. Herein also the general procedure and guidance of ASTM D4365-95 is followed in the application of the BET method to zeolite Y materials. To ensure a consistent state of the sample to be measured, specifically all samples undergo a pretreatment. Specifically the pretreatment involves heating the sample, for example to a temperature of 400 to 500° C., for a time sufficient to eliminate free water, eg 3 to 5 hours. The nitrogen porosimetry measurements utilised in the surface area (BET) determination, can also be used to determine other properties such as mesopore (pores having a diameter of 2 nm or more) area. For the zeolites of the present invention, the mesopore area is generally in excess of 50 m²/g.

All of the above measurement and determination procedures are well known to those skilled in the art.

The zeolite Y to be used in accordance with the present invention can suitably prepared by a process which comprises the steps of:
(a) providing a starting zeolite of the faujasite structure having a silica to alumina ratio of from 4.5 to 6.5 and an alkali level of less than 1.5% wt;
(b) steam calcination by treating said starting zeolite at a temperature in the range of from 550 to 750° C. and at a partial pressure of steam in the range of from 5 to 50 vol %, basis total gas present, for a time effective to produce an intermediate zeolite having a unit cell size of from 24.40 to 24.50 Å;
(c) contacting the intermediate zeolite with an acidified solution comprising of from 4 to 9 mmole of acid having a pKa below 0 per gram of zeolite and optionally an ammonium salt under conditions effective to produce a zeolite having a unit cell size in the range of from 24.42 Å to 24.52 Å; a SAR in the range of from 10 to 15; and a surface area of from 910 to 1020 m²/g; and
(d) recovering said zeolite.

The steaming in step (b) is most usefully carried out for a time in the range of from 0.5 hours to 5 hours, preferably from 0.5 to 3 hours.

Suitable processes for preparing the zeolite Y to be used in accordance with the present invention have been described in WO 2011/067258 A1 which is hereby incorporated by reference.

The alumina binder component with which the zeolite Y is mixed in step (b) can suitably be boehmite, pseudoboehmite or gamma alumina. Preferably the binder is a gamma alumina, more preferably a gamma alumina with a surface area of at least 50 m²/g, more preferably a surface area more than 60 m²/g, more preferably more than 70 m²/g, most preferably more than 80 m²/g.

In step (a), the zeolite Y and the alumina binder component are mixed with two or more catalytically active metal components which metal components are contained in one or more solutions. Preferably, in step (a) the two or more catalyticaly active metal components are contained in one solution. When use is made of two or more solutions, the two or more solution may contain the same catalytically active metal components or each solution may contain one or more different catalytically active metal components.

In step (e), the calcined product as obtained in step (d) is mixed with two or more catalytically active metal components which metal components are contained in one or more solutions. Preferably, the two or more catalyticaly active metal components are contained in one solution. When use is made of two or more solutions, the two or more solution may contain the same catalytically active metal components or each solution may contain one or more different catalytically active metal components.

Accordingly, the present invention preferably provides a process for the preparation of a hydrocracking catalyst, which comprises the steps of:
(a) mixing a zeolite Y having a unit cell size in the range of from 24.42 Å to 24.52 Å, a bulk silica to alumina molar ratio (SAR) in the range of from 10 to 15, and a surface area of from 910 to 1020 m²/g with an alumina binder component and a first metals-containing solution, wherein the zeolite Y is present in an amount of 40 wt. % or greater, based on the total weight of the zeolite Y and the alumina binder component;
(b) extruding the mixture as obtained in step (a;
(c) drying the extruded mixture as obtained in step (b);
(d) calcining the dried and extruded mixture as obtained in step (c); and
(e) mixing the calcined product as obtained in step (d) with a second metals-containing solution.

In the preparation of the catalyst of the invention, following the mixing of zeolite Y with binder, an acidic aqueous solution may be added to the mixture. Alternatively, the acidic aqueous solution can be added to the alumina binder component after which the alumina binder component is mixed with the zeolite Y. Any convenient mono-basic acid may be used for the acidic solution; examples are nitric acid and acetic acid.

The mixture of zeolite Y, alumina binder component and acidic aqueous solution can then suitably be co-mulled in a conventional manner.

The first metals-containing solution can suitably be added to the zeolite Y before mixing with the alumina binder component and acidic aqueous solution or to mixture of zeolite Y, alumina binder component and the acidic aqueous solution before or after co-mulling. The first metals-containing solution is preferably added after the mixture of zeoliet Y, alumina binder component and acidic aqueous solution has been co-mulled.

The first metals-containing suitably comprises at least two catalytically active metal components chosen from the Group VIB metals (e.g. molybdenum and tungsten) and a catalytically active metal component chosen from the non-noble Group VIII metals (e.g. cobalt, nickel, iridium, platinum and palladium), their oxides and sulphides.

As regards the metals specified here and later in the patent application reference is made to the Periodic Table of Elements which appears on the inside cover of the CRC Handbook of Chemistry and Physics ('The Rubber Handbook'), 66$^{th}$ edition and using the CAS version notation.

Preferably, the catalytically active components are selected from nickel, cobalt, molybdenum, tungsten, platinum and palladium.

The catalyst composition will preferably contain molybdenum and/or tungsten component in combination with a cobalt and/or nickel component. Particularly preferred combinations are nickel/tungsten and nickel/molybdenum. Most preferred is a combination of nickel/tungsten.

Suitable metals salts for both co-mulling and impregnation preparation routes in step (a) are acetates, carbonates, nitrates and ammonium salts, such as nickel acetate, nickel nitrate, nickel carbonate, and ammonium metatungstate, as are well known to those skilled in the art. For environmental reasons nitrate and carbonate salt solutions are preferred over the use of acetate solutions.

Preferably, the loading of the catalytically active metal components in step (a) is for instance carried out by impregnation (e.g. pore volume impregnation). In such a pore volume impregnation process, the two or more catalytically active metal components may be loaded onto the co-mulled mixture of zeolite Y and the alumina binder component.

Dependent on the kind and amount of catalytically active metal components to be used, the co-mulled mixture may be loaded using either a single solution comprising both the catalytically active metal components in the form of metal-containing compounds or two or more solutions of which at least one solution contains a catalytically active metal component chosen from the Group VIB metals in the form of a metal-containing compound and at least one other solution contains a catalytically active metal component chosen from the non-noble Group VIII metals in the form of metal-containing compound. The use of more than one solution may be required if metal containing-compounds would precipitate if present in a single solution.

When the first metals-containing solution is used for pore volume impregnation of the support, the amount of water and metal-containing compounds are chosen such as to prevent metal precipitation. However, precipitated metals are acceptable when the first metals-containing solution is used in co-mulling.

Metal-containing compounds suitable for use in loading the support with two or more catalytically active metal components are compounds which are soluble in water.

The first metals-containing solution to be used in accordance with the present invention is preferably prepared by adding two or more catalytically active metal components to water while stirring, optionally at increased temperature such as of from 18 to 95° C., more specifically of from 20 to 80° C., in order to obtain an aqueous solution in which the majority of the catalytically active metal components have been dissolved. Preferably, at least 80% by weight of the added metal-containing compounds has been dissolved, more specifically at least 90%, more specifically at least 95% and most preferably all added metal-containing compounds have been dissolved.

The order of adding the, or each of the, catalytically active metal components depends on the kind and amount of the metal-containing compounds used for preparing the aqueous solution.

Typically, the first metals-containing solution is mixed in step (a) under atmospheric pressure for at least 1 minute (usually 0.5-2 hours) prior to drying. The impregnation may also be carried out under reduced or over pressure under air or inert atmosphere. The temperature during the impregnation in step (a) is typically between room temperature and 80° C.

The amounts of the catalytically active metal components used in step (a) is suitably such that it represents Group VIB metals in an amount in the range of 2-11 wt. %, and non-noble Group VIII metals in an amount in the range of from 0.5-4 wt. %, both weights based on the total weight of the hydrocracking catalyst to be prepared.

In step (b), the mixture as obtained in step (a is extruded. During extrusion, conventionally extrusion aids are utilized; usual extrusion aids include Methocel and Superfloc.

Extrusion may be effected using any conventional, commercially available extruder. In particular, a screw-type extruding machine may be used to force the mixture through orifices in a die plate to yield catalyst extrudates of the required form, e.g. cylindrical or trilobed. The strands formed on extrusion may then be cut to the appropriate length, for example 1.6, 2.5, 2.8 mm. The catalyst extrudates may be dried, e.g. at a temperature of from 100 to 300° C. for a period of 10 minutes to 3 hours, prior to calcination.

The extrudate as obtained in step (b) is dried in step (c). The catalyst extrudates may be dried, e.g. at a temperature of from 100 to 300° C. for a period of 10 minutes to 3 hours, prior to calcinations in step (d).

In step (d), the calcination temperature used is preferably in the range of from 500 to 850° C. More preferably, the calcination temperature is in the range of from 650 to 820° C., and it is especially preferred in the range of from 700 to 750° C. The calcination in step (d) is conveniently carried out in air for a period of from 30 minutes to 4 hours. The time taken for the calcination is not usually critical.

In step (e), the calcined product as obtained in step (d) is mixed with two or more catalytically active metal components that are contained in one or more solutions. Suitably, the mixing in step (e) is carried out by way of impregnation the product as obtained in step (d). Preferably, the product as obtained in step (d) is impregnated with the second metals-containing solution.

The second metals-containing suitably comprises at least two catalytically active metal components chosen from the Group VIB metals (e.g. molybdenum and tungsten) and a catalytically active metal component chosen from the non-noble Group VIII metals (e.g. cobalt, nickel, iridium, platinum and palladium), their oxides and sulphides.

Preferably, the catalytically active components are selected from nickel, cobalt, molybdenum, tungsten, platinum and palladium.

The catalyst composition will preferably contain molybdenum and/or tungsten component in combination with a cobalt and/or nickel component. Particularly preferred combinations are nickel/tungsten and nickel/molybdenum. Most preferred is a combination of nickel/tungsten.

Suitable metals salts for use in step (e) are acetates, carbonates, nitrates and ammonium salts, such as nickel acetate, nickel nitrate, nickel carbonate, and ammonium metatungstate, as are well known to those skilled in the art. Nitrate and carbonate salt solutions are preferred over the use of acetate solutions.

Dependent on the kind and amount of catalytically active metal components to be used, the calcined catalyst as obtained in step (d) may be further loaded with catalytically active metal components using either a single solution comprising both the catalytically active metal components in the form of metal-containing compounds or two or more solutions of which at least one solution contains a catalytically active metal component chosen from the Group VIB metals in the form of a metal-containing compound and at least one other solution contains a catalytically active metal component chosen from the non-noble Group VIII metals in the form of metal-containing compound. The use of more than one solution may be required if metal containing-compounds would precipitate if present in a single solution.

The amount of water and metal-containing compounds to be used in the impregnation in step (e) are chosen such as to prevent metal precipitation.

Metal-containing compounds suitable for use in loading the support with two or more catalytically active metal components are compounds which are soluble in water.

The second metals-containing solution to be used in accordance with the present invention is preferably prepared by adding two or more catalytically active metal components to water while stirring, optionally at increased temperature such as of from 18 to 95° C., more specifically of from 20 to 80° C., in order to obtain an aqueous solution in which the majority of the catalytically active metal components have been dissolved. Preferably, at least 80% by weight of the added metal-containing compounds has been dissolved, more specifically at least 90%, more specifically at least 95% and most preferably all added metal-containing compounds have been dissolved.

The order of adding the, or each of the, catalytically active metal components depends on the kind and amount of the metal-containing compounds used for preparing the aqueous solution.

Typically, the second metals-containing solution is mixed in step (e) under atmospheric pressure for at least 1 minute (usually 0.5-2 hours) prior to drying. The impregnation may also be carried out under reduced or over pressure under air or inert atmosphere. The temperature during the impregnation in step (e) is typically between room temperature and 80° C.

The impregnation in step (e) is preferably carried out in the presence of a hydroxy carboxylic acid. The hydroxy carboxylic acid used in step (e) preferably comprises gluconic acid, malic acid, tartaric acid, citric acid or a mixture thereof. More preferably, the hydroxy carboxylic acid is citric acid or malic acid, more preferably the hydroxy carboxylic acid is citric acid.

Preferably, the second metals-containing solution comprises the hydroxy carboxylic acid. If a single metals-containing solution is used in step (e) it may suitable the hydroxy carboxylic acid. When two or more metal-containing solutions are used in step (e) at least one contains a hydroxy carboxylic acid.

The exact amount of hydroxy carboxylic acid depends on the amount of catalytically active metal component and the kind of metal or metals present. The solution will generally contain from 1 to 25% by weight of hydroxy carboxylic acid, more specifically from 2 to 20% by weight, basis total amount of aqueous solution.

An impregnation solution for use in step (e) is preferably prepared by adding two or more catalytically active metal components and the hydroxy carboxylic acid to water while stirring, optionally at increased temperature such as of from 18 to 95° C., more specifically of from 20 to 80° C., in order to obtain an aqueous solution in which the majority of the catalytically active metal components have been dissolved. Preferably, at least 80% by weight of the added metal containing components has been dissolved, more specifically at least 90%, more specifically at least 95% and most preferably all added metal containing components have been dissolved.

The hydrocracking catalyst as obtained in step (e) can for instance suitably be transferred to a hydrocracking reactor where the hydrocracking catalyst will be calcined before use in a hydrocracking catalyst.

Suitably, the catalytically active metal component chosen from the Group VIB metals is present in an amount in the range of 10-24 wt. %, preferably in the range of from 11-20 wt. %, more preferably in the range of from 12-16 wt. %, and the catalytically active metal component chosen from the non-noble Group VIII metals is present in an amount in the range of from 3-10 wt. %, preferably in the range of from 4-9 wt. %, all weights based on the total weight of the hydrocracking catalyst.

In a step (f), prior to use in a hydrocracking process, the hydrocracking catalyst as obtained in step (e) is calcined. The calcination temperature used is suitably in the range of from 350 to 850° C. Preferably, the calcination temperature in step (f) is in the range of from 350 to 650° C., and it is especially preferred in the range of from 400 to 550° C. The calcination in step (f) is conveniently carried out in air for a period of from 30 minutes to 4 hours. The time taken for the calcination is not usually critical. The calcinations in step (f) may be carried out after the hydrocracking catalyst as obtained in step (e) has been loaded into a hydrocracking reactor.

The hydrocracking catalyst prepared in accordance with the present invention finds especially application as a naphtha-selective hydrocracking catalyst. Thus, the present invention also provides a hydrocracking process for converting a hydrocarbonaceous feedstock into lower boiling materials which comprises contacting the feedstock with hydrogen at elevated temperature and elevated pressure in the presence of a hydrocracking catalyst prepared with the process according to the present invention.

Examples of such processes comprise single-stage hydrocracking, two-stage hydrocracking, and series-flow hydrocracking. Definitions of these processes can be found in pages 602 and 603 of Chapter 15 (entitled "Hydrocarbon processing with zeolites") of "Introduction to zeolite science and practice" edited by van Bekkum, Flanigen, Jansen; published by Elsevier, 1991.

It will be appreciated that the hydrocracking processes of the present invention can be carried out in any reaction vessel usual in the art. Thus the process may be performed in a fixed bed or moving bed reactor. Also the hydrocracking catalyst of the invention may be used in conjunction with any suitable co-catalyst or other materials usual in the art. Thus for example the hydrocracking catalyst of the invention may be used in stacked bed formation with one or more other catalysts useful in hydroprocessing, for example with a catalyst containing a different zeolite, with a catalyst containing a faujasite zeolite of different unit cell size, most preferably a unit cell size of greater than 24.40 Å, with a catalyst utilizing an amorphous carrier, and so on. Various stacked bed combinations have been proposed in the literature: WO-99/32582; EP-A-310,164; EP-A-310,165; and EP-A-428,224 may, for example, be mentioned.

The hydrocarbonaceous feedstock useful in the present process can vary within a wide boiling range. They include atmospheric gas oils, coker gas oils, vacuum gas oils, deasphalted oils, waxes obtained from a Fischer-Tropsch synthesis process, long and short residues, catalytically cracked cycle oils, thermally or catalytically cracked gas oils, and syncrudes, optionally originating from tar sand, shale oils, residue upgrading processes and biomass. Combinations of various hydrocarbon oils may also be employed. Typically, though, the feedstocks most suited for the process of the invention are the lighter feedstocks or fractions obtained by treatment of a feedstock through cracking or fractionation. Such feedstocks include atmospheric and vacuum gas oils, gas oils formed by cracking processes, cycle oils, and similar boiling range feedstocks. The boiling range will generally be of the order of from about 90 to 650° C. The feedstock may have a nitrogen content of up to 5000 ppmw (parts per million by weight) and a sulphur content of up to 6 wt %. Typically, nitrogen contents are in the range from 10, eg from 100, to 4000 ppmw, and sulphur contents are in the range from 0.01, eg from 2, to 5 wt %. It is possible and may sometimes be desirable to subject part or all of the feedstock to a pretreatment, for example, hydrodenitrogenation, hydrodesulphurisation or hydrodemetallisation, methods for which are known in the art.

The process of the invention may conveniently be carried out at a reaction temperature in the range of from 250 to 500° C.

The present process is preferably carried out at a total pressure (at the reactor inlet) in the range of from $3 \times 10^6$ to $3 \times 10^7$ Pa, more preferably from $8 \times 10^6$ to $2.0 \times 10^7$ Pa. Where a hydrocracking process is carried out at a low pressure of, for example, up to $1.2 \times 10^7$ Pa this may be termed 'mild hydrocracking'.

The hydrogen partial pressure (at the reactor inlet) is preferably in the range from $3 \times 10^6$ to $2.9 \times 10^7$ Pa, more preferably from $8 \times 10^6$ to $1.75 \times 10^7$ Pa.

A space velocity in the range from 0.1 to 10 kg feedstock per litre catalyst per hour ($kg \cdot l^{-1} \cdot h^{-1}$) is conveniently used. Preferably the space velocity is in the range from 0.1 to 8, particularly from 0.2 to 5 $kg \cdot l^{-1} \cdot h^{-1}$.

The ratio of hydrogen gas to feedstock (total gas rate) used in the present process will generally be in the range from 100 to 5000 Nl/kg, but is preferably in the range from 200 to 3000 Nl/kg.

Particularly advantageous results are obtained when the catalytically active metal components are present in the sulphide form. Consequently, the process according to the present invention optionally comprises a further step of sulfidation following the aforementioned step of calcining the hydrocraking catalyst in step (f).

Sulfidation may be carried out after the hydrocracking catalyst has been loaded into a hydrocracking reactor. Alternatively, the catalyst composition may be sulfided prior to its use in a hydrocracking reactor. The catalyst composition may preferably be sulfided using a liquid phase sulfidation agent prior to use of the catalyst composition in a hydrocracking reactor. Most preferably, the catalyst composition may be sulfided using $H_2S$ in the gas phase at elevated temperature, typically above 300° C., prior to use of the catalyst composition in a hydrocracking reactor.

The hydrocarbonaceous feedstocks useful in the present process can vary within a wide boiling range. They include atmospheric gas oils, coker gas oils, vacuum gas oils, deasphalted oils, waxes obtained from a Fischer-Tropsch synthesis process, long and short residues, catalytically cracked cycle oils, thermally or catalytically cracked gas oils, and syncrudes, optionally originating from tar sand, shale oils, residue upgrading processes and biomass. Combinations of various hydrocarbon oils may also be employed. Typically, though, the feedstocks most suited for the process of the invention are the lighter feedstocks or fractions obtained by treatment of a feedstock through cracking or fractionation. Such feedstocks include atmospheric and vacuum gas oils, gas oils formed by cracking processes, cycle oils, and similar boiling range feedstocks. The boiling range will generally be of the order of from about 90 to 650° C. The feedstock may have a nitrogen content of up to 5000 ppmw (parts per million by weight) and a sulphur content of up to 6 wt %. Typically, nitrogen contents are in the range from 10, e.g. from 100, to 4000 ppmw, and sulphur contents are in the range from 0.01, e.g. from 1, to 5 wt %. It is possible and may sometimes be desirable to subject part or all of the feedstock to a pre-treatment, for example, hydrodenitrogenation, hydrodesulphurisation or hydrodemetallisation, methods for which are known in the art.

The hydrocracking process of the invention may conveniently be carried out at a reaction temperature in the range of from 250 to 500° C.

The present hydrocracking process is preferably carried out at a total pressure (at the reactor inlet) in the range of from $3 \times 10^6$ to $3 \times 10^7$ Pa, more preferably from $8 \times 10^6$ to $2.0 \times 10^7$ Pa. Where a hydrocracking process is carried out at a low pressure of, for example, up to $1.2 \times 10^7$ Pa this may be termed 'mild hydrocracking'.

The hydrogen partial pressure (at the reactor inlet) is preferably in the range from $3 \times 10^6$ to $2.9 \times 10^7$ Pa, more preferably from $8 \times 10^6$ to $1.75 \times 10^7$ Pa. A space velocity in the range from 0.1 to 10 kg feedstock per litre catalyst per hour ($kg \cdot l^{-1} \cdot h^{-1}$) is conveniently used. Preferably the space velocity is in the range from 0.1 to 8, particularly from 0.2 to 5 $kg \cdot l^{-1} \cdot h^{-1}$. The ratio of hydrogen gas to feedstock (total gas rate) used in the present process will generally be in the range from 100 to 5000 Nl/kg, but is preferably in the range from 200 to 3000 Nl/kg.

The present invention also encompasses use of a hydrocracking catalyst prepared by the process of the present invention in a hydrocracking process for one or more of the following purposes: (a) limiting the hydrogenation of aromatic compounds in the hydrocracking process, (b) limiting the generation of naphthenes in the hydrocracking process, and (c) limiting the consumption of hydrogen in the hydrocracking process.

The catalyst prepared by the process of the present invention is especially suitable for use as hydrocracking catalyst and more specifically as the second catalyst in a two stage hydrocracking process. The latter process comprises contacting a hydrocarbon feedstock in the presence of hydrogen with a first catalyst for hydrotreating and hydrogenation and subsequently with a second catalyst for hydrocracking and further hydrogenation. Each stage can consist of one or more beds of catalysts stacked vertically one above the other and separated by a void spaced into which cold hydrogen gas can be injected as quench. The feedstock preferably is a gas oil or a vacuum gas oil, or mixture thereof.

Preferably, the catalyst as prepared in accordance with the present invention is used in a two stage hydrocracking process as the second catalyst for hydrocracking a hydrocarbonaceous feedstock, which process comprises contacting gaseous feedstock at a reaction temperature in the range of 250 to 500° C. and a total pressure at the reactor inlet in the range of from $3 \times 10^6$ to $3 \times 10^7$ Pa in the presence of hydrogen with a catalyst according to the present invention in which the gaseous feedstock contains less than 250 parts per million by weight (ppmw) of ammonia. More preferably, the feedstock furthermore comprises less than 250 ppmw of hydrogen sulphide.

The present invention will now be illustrated by the following Examples.

EXAMPLES

In the Examples the following test methods have been used:

Unit Cell Size:

Determined by X-ray diffraction using the method of ASTM D-3942-80.

Surface Area:

Determined in accordance with the conventional BET (Brunauer-Emmett-Teller) method nitrogen adsorption technique as described in the literature at S. Brunauer, P. Emmett and E. Teller, J. Am. Chm. Soc., 60, 309 (1938), and ASTM method D4365-95. In the determinations quoted below, the results are given as a single point assessment taken at a nitrogen partial pressure of 0.03 following a high temperature pretreatment.

Silica to Alumina Molar Ratio (SAR):

Determined by chemical analysis; values quoted are 'bulk' SAR (that is to say the overall SAR) and not specifically the SAR of the crystalline framework.

Example 1

Hydrocracking Catalyst Preparation (According to the Invention)

A zeolite Y having a unit cell size 24.49 Å, a SAR of 11.5 and a surface area of 950 $m^2/g$ was loaded into a muller at low speed and alumina (WPA alumina ex Criterion Catalysts & Technologies) is added to provide the zeolite Y in an amount of 68.8 wt % and alumina in an amount of 17.3 wt %, dry basis, of 80:20, and Methocel K-15MS in an amount of 1.8 wt % basis total dry solids, was added and the whole mixed at high speed for 2 minutes. The first metals solution was an aqueous solution of a nickel nitrate solution (20.2 wt % nickel) and an ammonium metatungstate solution (70.9 wt % tungsten); the overall metals solution contained 6.3 wt % nickel and 20.5 wt % tungsten and had a pH of 2.4.

Deionised water to achieve a loss on ignition in the product of 50% and nitric acid (2 wt % total dry solids) to peptise the alumina was then added and mixing continued at high speed until the colour of the mix changed to a darker green and large lumps appeared in the mix from agglomeration of the materials. Superfloc, in an amount of 1.0 wt %, basis total dry solids, was then added and the whole mixed for a further 5 minutes until an extrudable mix was formed. The mix was then extruded in a screw extruder to obtain extrudates having the form of 2.5 mm diameter trilobes. The extrudates were dried in a rotating drum at a temperature of 130° C. for about 90 minutes, and then calcined at 735° C. for about 2 hours.

The calcined hydrocracking catalyst so obtained was then impregnated with a second metals solution. The second metals solution was an aqueous solution of a nickel carbonate solution (41 wt % nickel), an ammonium metatungstate solution (70.9 wt % tungsten), and 7.5 wt % citric acid; the overall metals solution contained 2.1 wt % nickel and 6.9 wt % tungsten. The hydrocracking catalyst obtained after impregnation with the second metals solution was then calcined at 450° C. for about 2 hours.

The final catalysts had the following composition: 7.6 wt % as nickel oxide (6.0 wt % nickel); 16.4 wt % as tungsten oxide (13.0 wt % tungsten); 60.8 wt % zeolite Y; and 15.2 wt % alumina binder, all basis total catalyst.

Example 2

Hydrocracking Catalyst Preparation (According to the Invention)

A hydrocracking catalyst was prepared as described in Example 1 with the exception that the second metals solution was an aqueous solution of a nickel carbonate solution (41 wt % nickel), an ammonium metatungstate solution (70.9 wt % tungsten), 9.4 wt % citric acid and 6.0 wt % malic acid; the overall metals solution contained 5.25 wt % nickel and 7.1 wt % tungsten.

The final catalysts had the following composition: 11.5 wt % as nickel oxide (9.0 wt % nickel); 16.4 wt % as tungsten oxide (13.0 wt % tungsten); 57.7 wt % zeolite Y; and 14.4 wt % alumina binder, all basis total catalyst.

Example 3

Hydrocracking Catalyst Preparation (According to the Invention)

A hydrocracking catalyst was prepared as described in Example 2 with the exception that the extrusion was carried out in such a way that extrudates were obtained having the form of 1.6 mm diameter trilobes.

Example 4

Hydrocracking Catalyst Preparation (According to the Invention)

A hydrocracking catalyst was prepared as described in Example 3 with the exception that the second metals solution did not contain citric acid and malic acid.

Example 5

Hydrocracking Catalyst Preparation (Comparative)

A zeolite Y having a unit cell size 24.50 Å, SAR 8.25 and a surface area of 865 m²/g was loaded into a muller at low speed and mixed with a first metals solution for five minutes following which alumina (WPA alumina ex Criterion Catalysts & Technologies) is added to provide the zeolite Y in an amount of 72 wt % and the alumina in an amount of 7 wt %, dry basis, of 75:25, and Methocel K-15MS in an amount of 1.8 wt % basis total dry solids, was added and the whole mixed at high speed for 5 minutes. The first metals solution was an aqueous solution of a nickel nitrate solution (20.2 wt % nickel); the overall metals solution contained 6 wt % nickel and had a pH 2.4.

Deionised water to achieve a loss on ignition in the product of 50% and nitric acid (2 wt % total dry solids) to peptise the alumina was then added and mixing continued at high speed until the colour of the mix changed to a darker green and large lumps appeared in the mix from agglomeration of the materials. Superfloc, in an amount of 1.0 wt %, basis total dry solids, was then added and the whole mixed for a further 5 minutes until an extrudable mix was formed. The mix was then extruded in a screw extruder to obtain extrudates having the form of 2.5 mm diameter trilobes. The extrudates were then calcined at 735° C. for about 2 hours.

The calcined hydrocracking catalyst so obtained was then impregnated with a second metals solution. The second metals solution was an aqueous solution of a nickel nitrate solution (20.2 wt % nickel), and an ammonium metatungstate solution (70.9 wt % tungsten); the overall metals solution contained 7.8 wt % nickel and 16.9 wt % tungsten. The hydrocracking catalyst obtained after the impregnation with the second metals solution was then calcined at 450° C. for about 2 hours.

The final catalysts had the following composition: 11.5 wt % as nickel oxide (9.0 wt % nickel); 16.4 wt % as tungsten oxide (13.2 wt % tungsten); 54.1 wt % zeolite Y; and 18 wt % alumina binder, all basis total catalyst.

Example 6

Hydrocracking Catalyst Preparation (Comparative)

A zeolite Y having a unit cell size 24.49 Å, a SAR of 11.5 and a surface area of 950 m²/g was loaded into a muller at low speed and mixed with a first metals solution for five minutes following which alumina (WPA alumina ex Criterion Catalysts & Technologies) is added to provide the zeolite Y in an amount of 57.7 wt % and alumina in an amount of 14.4 wt %, dry basis, of 80:20, and Methocel K-15MS in an amount of 1.8 wt % basis total dry solids, was added and the whole mixed at high speed for 1 to 5 minutes. The first metals solution was an aqueous solution of a nickel nitrate solution (20.2 wt % nickel) and an ammonium metatungstate solution (70.9 wt % tungsten); the overall metals solution contained 9.7 wt % nickel and 14.0 wt % tungsten and had a pH of 2.4.

Deionised water to achieve a loss on ignition in the product of 50% and nitric acid (2 wt % total dry solids) to peptise the alumina was then added and mixing continued at high speed until the colour of the mix changed to a darker green and large lumps appeared in the mix from agglomeration of the materials. Superfloc, in an amount of 1.0 wt %, basis total dry solids, was then added and the whole mixed for a further 5 minutes until an extrudable mix was formed.

The mix was then extruded in a screw extruder to obtain extrudates having the form of 1.6 mm diameter trilobes. The extrudates were then calcined at 735° C. for about 2 hours.

The final catalysts had the following composition: 11.5 wt % as nickel oxide (9.0 wt % nickel); 16.4 wt % as tungsten oxide (13.0 wt % tungsten); 57.7 wt % zeolite Y; and 14.4 wt % alumina binder, all basis total catalyst.

Example 7

Activity Testing

The hydrocracking performance was assessed of the hydrocracking catalysts prepared according to Example 1-6.

The testing was carried out in once-through microflow equipment which had been loaded with a catalyst bed comprising 15 ml of the test catalyst diluted with 15 ml of 0.1 mm SiC particles. The catalyst bed was presulphided prior to testing.

Each test involved the sequential contact of a hydrocarbonaceous feedstock with the catalyst bed in a once-through operation during about one month under the following process conditions: a space velocity of 1.3 kg feed oil per 1 catalyst per hour (kg·l$^{-1}$·h$^{-1}$), a hydrogen gas/feed oil ratio of 1000 Nl/kg, and a total pressure of 9,600 kPa (96 bar) at the inlet.

The test feedstock used had the following properties:

| | |
|---|---|
| Carbon content | 87.03 wt % |
| Hydrogen content | 12.95 wt % |
| Sulphur content | 0.024 wt % |
| Nitrogen (N) content | 13 ppmw |
| Added n-Decylamine (to achieve 150 ppmv NH$_3$) | 0.91 g/kg |
| Added sulphur Sulfrzol54 (to achieve 2500 ppmv H$_2$S) | 6.21 g/kg |
| Density (15/4° C.) | 0.8719 g/ml |
| Initial boiling point | 162° C. |
| 50% w boiling point | 308° C. |
| Final boiling point | 533° C. |
| Fraction boiling below 370° C. | 18.40 wt % |
| Fraction boiling below 191° C. | 3.13 wt % |

The results are shown in Table 1 below. Catalyst 1-4 are the hydrocracking catalyst prepared as described in Examples 1-4 respectively; Comparative Catalysts 5 and 6 are the hydrocracking catalysts as described in comparative Examples 5 and 6 respectively.

The hydrogen consumption in all cases was approximately 2.2 wt %.

The k(360) is the first order reaction (cracking) rate constant determined at 360° C.

The E-factor is yield ratio (% wt/% wt) of heavy naphtha (82-191° C.) to compounds containing of from 1 to 4 carbon atoms, and is a measure for the selectivity. It was assessed at 70% wt conversion of feed components boiling above 191° C.

From the results it can be seen that the hydrocracking catalysts according to the present invention have both a better activity and a better selectivity when compared with hydrocracking catalysts which have very similar compositions but which are prepared in a different manner.

TABLE 1

| Catalyst | Unit[1] cell size (Å) | SAR[1] | Surface[1] area (m$^2$/g) | k (360) | E-factor |
|---|---|---|---|---|---|
| Catalyst 1 | 24.49 | 11.5 | 950 | 2.35 | 4.68 |
| Catalyst 2 | 24.49 | 11.5 | 950 | 1.63 | 4.51 |
| Catalyst 3 | 24.49 | 11.5 | 950 | 2.45 | 5.11 |
| Catalyst 4 | 24.49 | 11.5 | 950 | 2.18 | 4.96 |
| Comparative Catalyst 5 | 24.50 | 8.25 | 865 | 1.54 | 3.86 |
| Comparative Catalyst 6 | 24.49 | 11.5 | 950 | 1.08 | 4.20 |

[1]properties of the zeolite

That which is claimed is:

1. A process for the preparation of a hydrocracking catalyst, which comprises the steps of:
   (a) mixing a zeolite Y, having a unit cell size in the range of from 24.42 to 24.52 Å, a bulk silica to alumina molar ratio (SAR) in the range of from 10 to 15, and a surface area of from 910 to 1020 m$^2$/g, with an alumina binder component, a first Group VIB metal component, and a first Group VIII metal component, which at least one of the metal components is contained in at least one first metal-containing acidic aqueous solution, to thereby provide a mixture, wherein the zeolite Y is present in the mixture in an amount of 40 wt. % or greater, based on the total weight of the zeolite Y and the alumina binder component;
   (b) extruding the mixture to provide an extruded mixture;
   (c) drying the extruded mixture to provide a dried and extruded mixture;
   (d) calcining the dried and extruded mixture to provide a calcined product;
   (e) impregnating the calcined product with a second Group VIB metal component and a second Group VIII metal component, which at least one of the metal components is contained in at least one second metal-containing solution to provide an impregnated product; and
   (f) calcining the impregnated product at a temperature in the range of from 350° C. to 850° C.

2. A process according to claim 1, wherein the impregnation in step (e) is carried out in the presence of a hydroxy carboxylic acid.

3. A process according to claim 2, wherein the hydroxy carboxylic acid comprises gluconic acid, malic acid, tartaric acid, citric acid or a mixture thereof.

4. A process according to claim 3, wherein the hydroxy carboxylic acid is citric acid or malic acid.

5. A process according to claim 1, wherein the second metals-containing solution comprises the hydroxy carboxylic acid.

6. A process according to claim 5, wherein the hydrocracking catalyst comprises Group VIB metal in an amount in the range of 10-24 wt. %, and a non-noble Group VIII metal is present in an amount in the range of from 3-10 wt. %, both weights being based on the total weight of the hydrocracking catalyst.

7. A process according to claim 6, wherein the first metal-containing solution, comprises nickel and tungsten, and the second metal-containing solution, comprises nickel and a Group VIB metal selected from the group consisting of tungsten and molybdenum.

8. A process according to claim 7, wherein step (c) is carried out at a temperature in the range of from 100° C. to 300° C.

9. A process according claim 1, wherein step (d) is carried out at a temperature in the range of from 500° C. to 850° C.

10. A process according to claim 1, wherein the calcined product as obtained in step (f) is subjected to a sulfidation step.

11. A process for hydrocracking a hydrocarbonaceous feedstock, which process comprises contacting the feedstock at elevated temperature with a hydrocracking catalyst as prepared by a process as claimed in claim 1.

12. A process according to claim 11, which process comprises contacting the feedstock with the catalyst composition at a reaction temperature in the range of from 250 to 500° C. and a total pressure at the reactor inlet in the range of from $3 \times 10^6$ to $3 \times 10^7$ Pa.

* * * * *